April 25, 1939.   T. G. NELSON   2,155,993
TYPEWRITING MACHINE
Filed Oct. 9, 1937   4 Sheets-Sheet 1
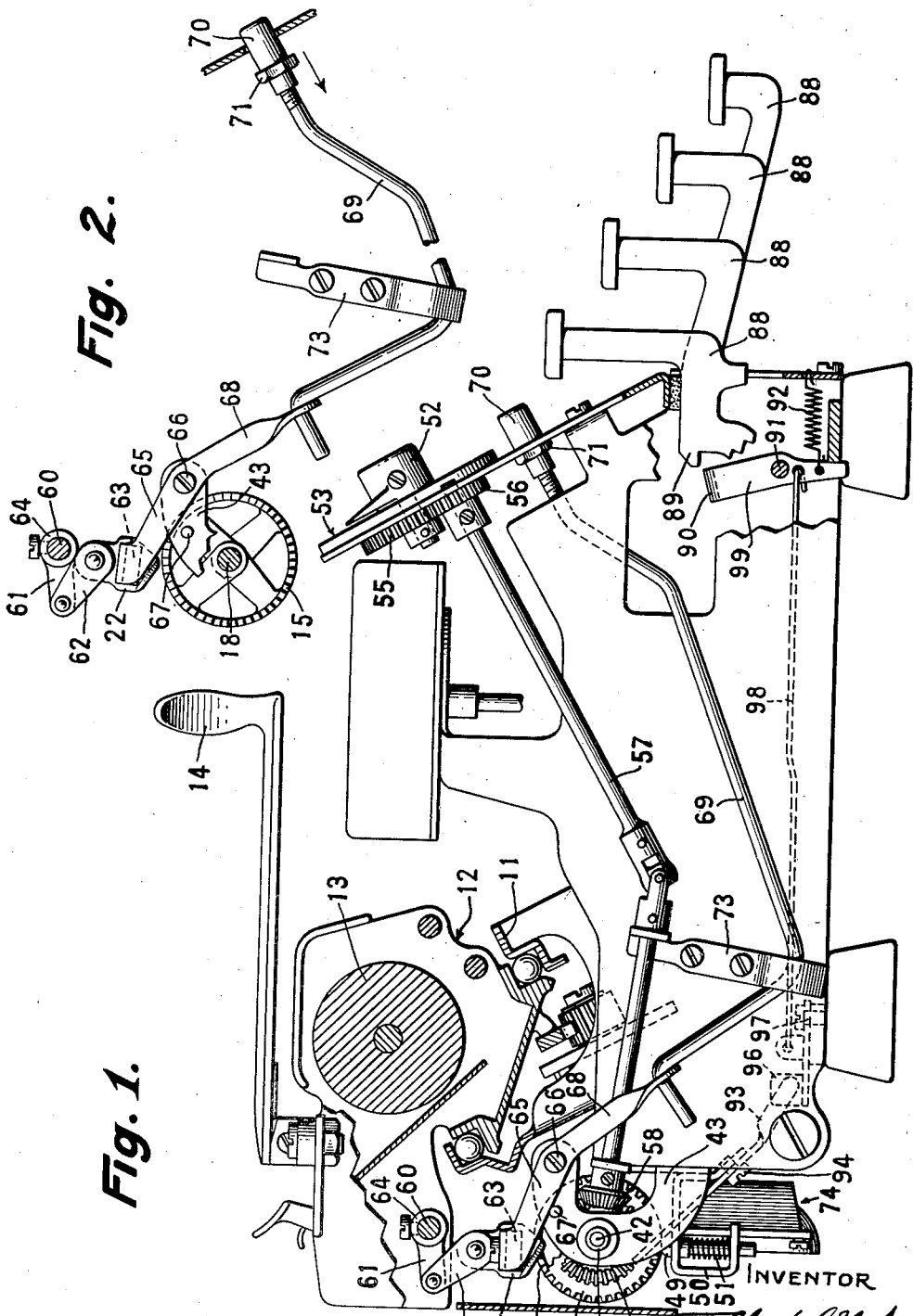
INVENTOR
Talbert G. Nelson
BY Jesse A. Holton
ATTORNEY April 25, 1939.  T. G. NELSON  2,155,993
TYPEWRITING MACHINE
Filed Oct. 9, 1937  4 Sheets-Sheet 2
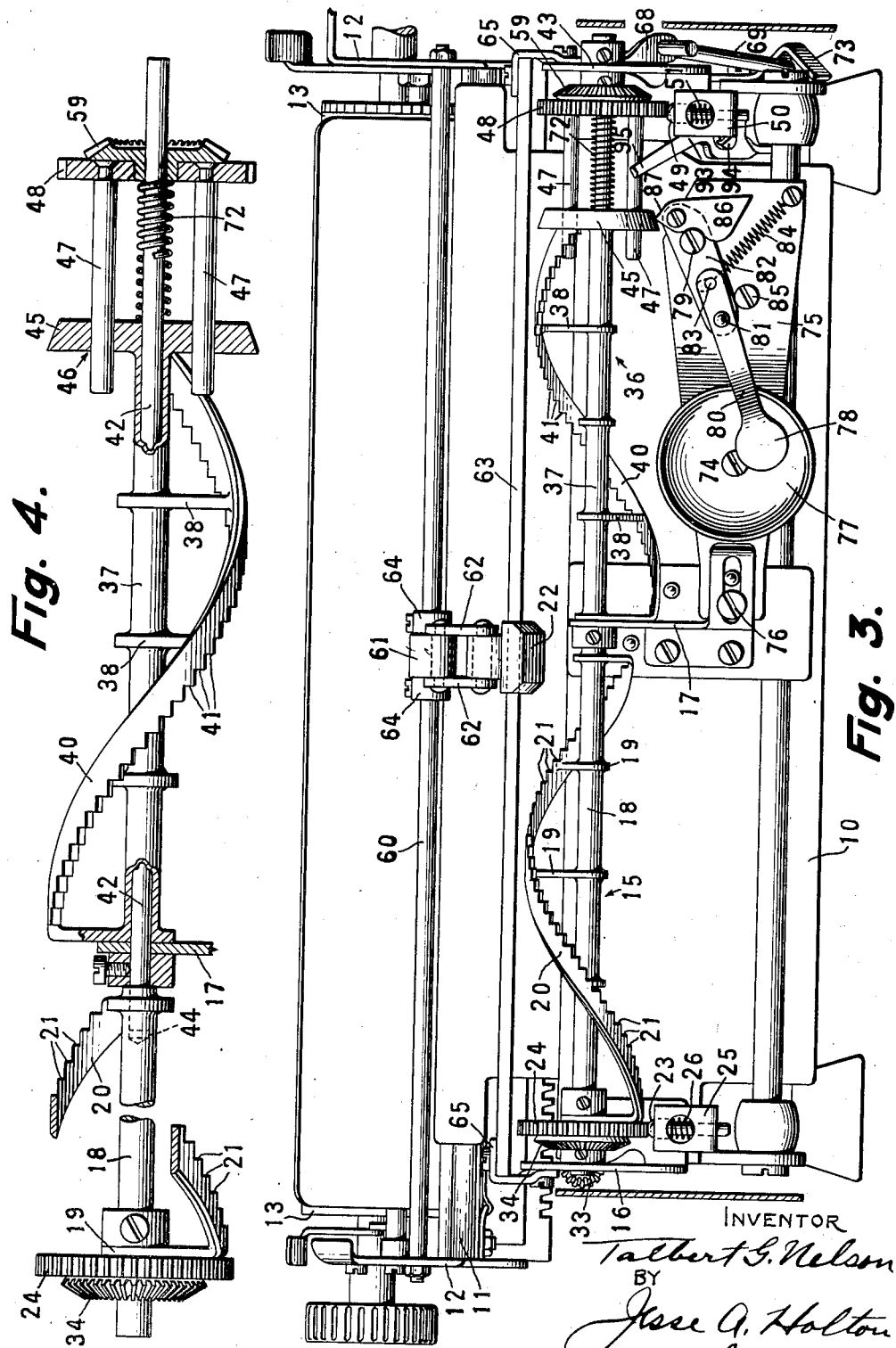

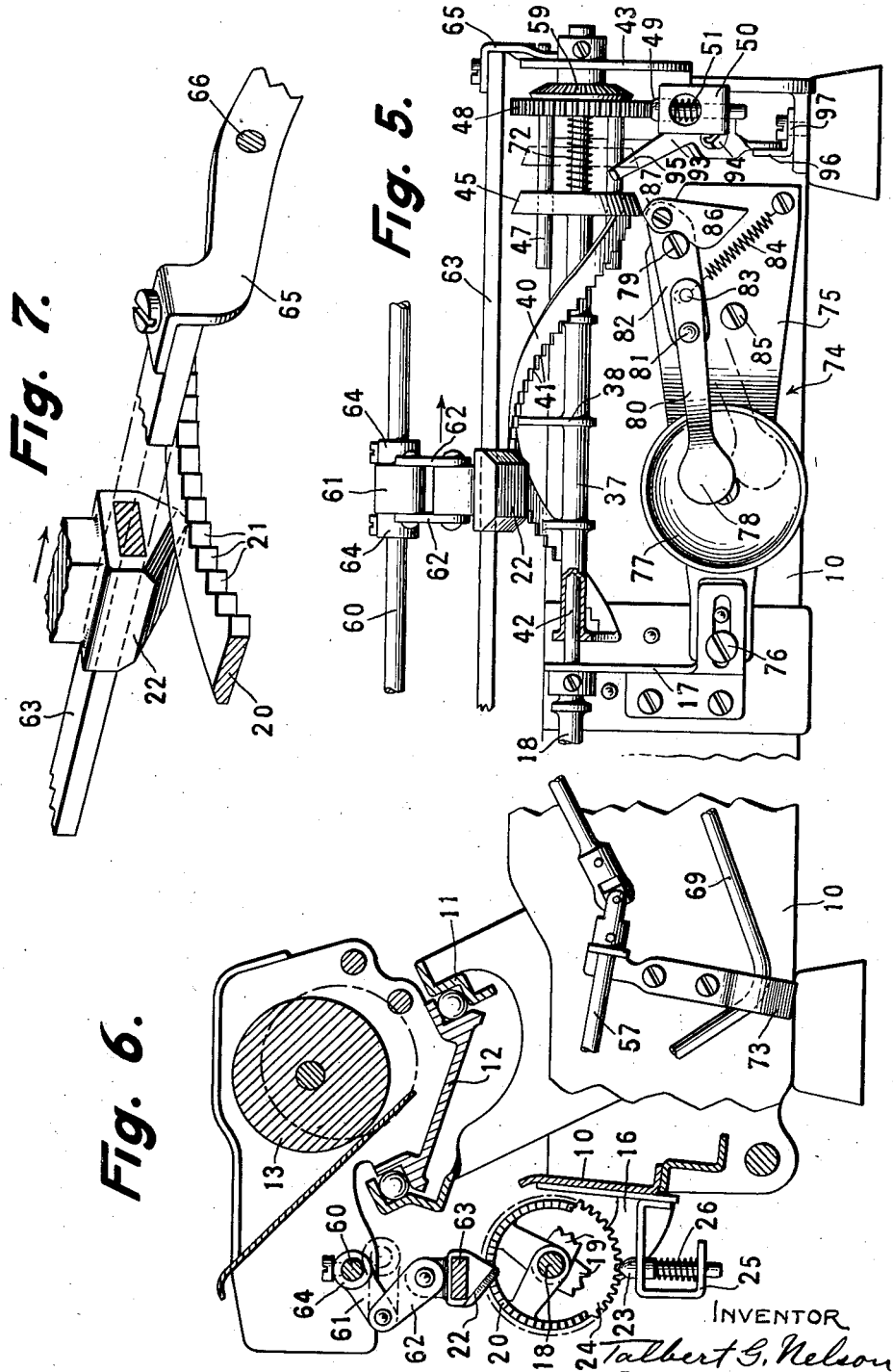

April 25, 1939.   T. G. NELSON   2,155,993
TYPEWRITING MACHINE
Filed Oct. 9, 1937   4 Sheets-Sheet 4

INVENTOR
Talbert G. Nelson
BY
Jesse A. Holton
ATTORNEY

Patented Apr. 25, 1939

2,155,993

UNITED STATES PATENT OFFICE 2,155,993

TYPEWRITING MACHINE

Talbert G. Nelson, New York, N. Y., assignor to Underwood Elliott Fisher Company, New York, N. Y., a corporation of Delaware Application October 9, 1937, Serial No. 168,136

8 Claims. (Cl. 197—63)

This invention relates to typewriting machines and particularly to adjustable margin-stops therefor.

An object of the invention is to provide a margin-stop device embodying simple and effective means for predeterminately limiting the typing area of a work-sheet with dependable accuracy, affording a wide range of adjustment in small increments over the entire typing area, to present a margin-stop of such adjustability as to be capable of predetermining type-line limits for substantially any arrangement of the typed matter that may be desired.

A further object resides in the provision of an adjustable margin-stop device entirely controllable at the front of the machine, the controlling means being conveniently accessible in full view by the operator without changing her typing position, and affording a conspicuous indication of each setting of the margin-stop.

The invention embodies various features of construction and arrangement, advantageous in the operation of the typewriter, such as positive functioning of the margin-stop, notwithstanding the wide range of small units of adjustment; another feature being that which permits resetting the stops for either margin to coincide with a previously typed portion, by a simple manipulation of the device as will hereinafter be apparent. Another feature is that of the association of a signal bell and, or, a type-action lock-system, each actuable directly by a lateral shifting of the margin-stop at the instant that the desired margin is exceeded.

The invention may be incorporated in any suitable typewriting machine, although the compact organization of its elements, as well as the adaptability of same to light-weight construction, makes the device particularly suitable for light-duty portable machines in which the features of compactness and easy portability are requisite.

Other features and advantages will hereinafter appear.

In the accompanying drawings:

Figure 1 is a side-elevational view of the typewriting machine with the outer casing removed, portions of the platen and carriage organization being shown in section.

Figure 2 is a side elevation illustrating the margin-stop release shown in Figure 1, but in actuated position.

Figure 3 is an elevational view of the rear of the machine with the outer casing removed showing the margin-stops ineffective, the platen-carriage being in an intermediate position.

Figure 4 is an enlarged elevation of the margin-stops partly broken away and in section.

Figure 5 is a fragmentary rear elevation similar to Figure 3, but showing one of the margin-stops being shifted axially in position at the instant of tripping the bell signal.

Figure 6 is a fragmentary view similar to Figure 1, but showing the margin-stop and associated parts partly in section, the platen and carriage being case-shifted for upper case typing.

Figure 7 is an enlarged perspective view illustrating the action of the counter-stop with one of the margin-stops incidental to the return movement of the platen-carriage after typing beyond a prescribed margin.

Figure 8:
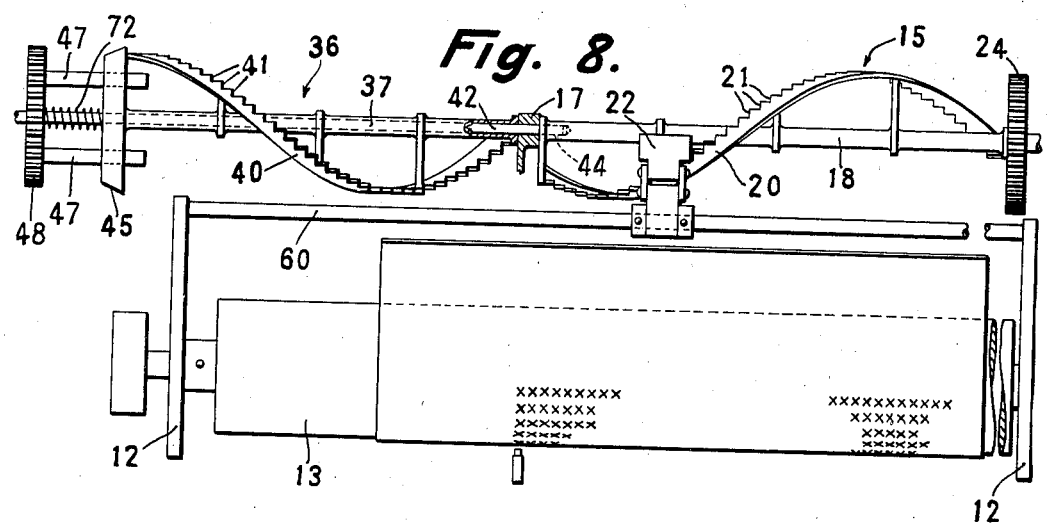
Figure 8 is a diagrammatic plan view showing the margin-stops in their functional relation to the type-margins of a typical work-sheet, the latter being in the typing position at the left margin.

The present embodiment of the invention illustrated in the drawings is incorporated in an Underwood portable typewriter and includes a main frame 10, a carriage trackway 11 mounted and guided thereon for case-shifting, and a platen-carriage 12 carried on the trackway 11 for lateral movement relative to the main frame 10, the carriage 12 being actuated by the usual spring and controlled by the usual letter-feed escapement-mechanism shown. The carriage 12 supports a platen 13 rotatable thereon to facilitate placement of a work-sheet into the machine and for advancing the platen in line-spacing, as by a line-space lever 14 operable to rotate the platen in the usual manner. The trackway 11 may be case-shifted to position the platen for upper and lower case typing by any suitable means such as that disclosed in the patent to W. A. Dobson, 1,858,041.

In accordance with the present invention, the lateral movement of the carriage 12 to the right may be variably limited to determine the left-hand margin on a work-sheet by a "left" margin-stop 15 rotatably mounted on brackets 16 and 17 at the back of the machine adjacent the platen-carriage 12. The margin-stop 15 includes a central member or shaft 18 from which projects a plurality of radial arms 19 disposed at various angles, to the free end of which is secured a helical stop-bar 20. One edge of bar 20 affords an abutment and is serrated to present a series of steps, each affording an abrupt shoulder 21 for engagement by a counter-stop 22, the margin-stop 15 being rotatable so as to selectively position any one of the shoulders 21 in the path of the counter-stop 22. Each angular position of margin-stop 15 is yieldably fixed by a resilient detent 23 engaging a toothed wheel 24 of the margin-stop, the detent 23 being slidable in a bracket 25 on the main frame 10 and pressed by a spring 26 against the wheel 24.

Figure 9:
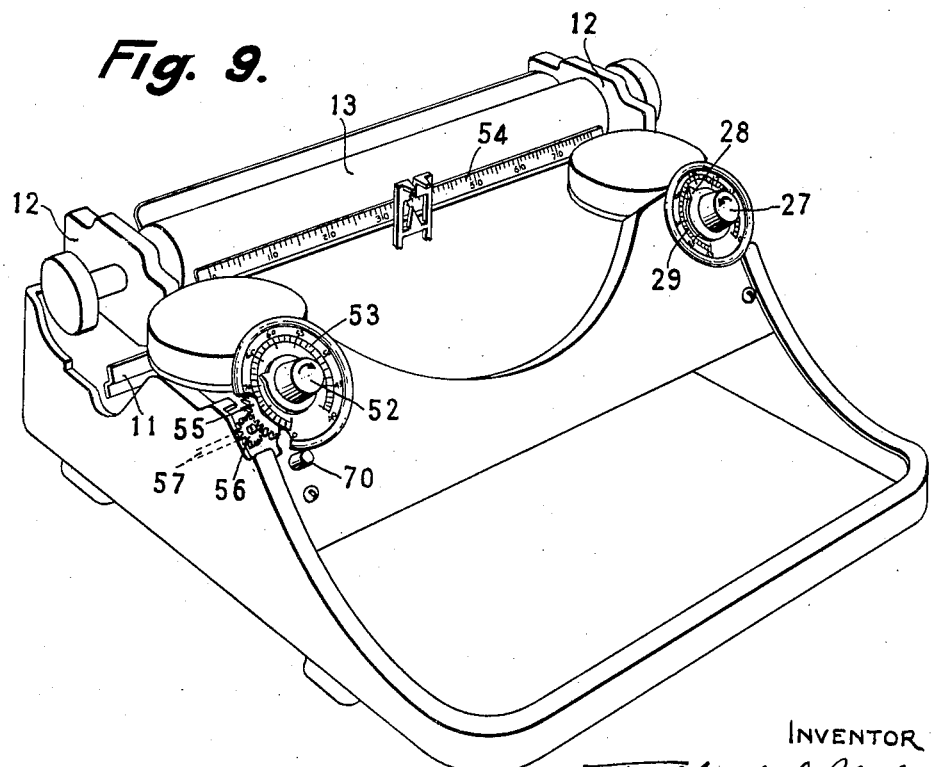
Figure 9 is a perspective view of the entire typewriting machine embodying the invention, a portion being broken away to expose certain parts to view.

The angular position of "left" margin-stop 15 is controlled by a manually operable control-knob 27 mounted at the front of the machine, see Figure 9, having a pointer 28 movable along a "left" margin-dial 29 associated therewith. Suitable gearing is interposed between control-knob 27 and the margin-stop 15 and preferably includes a pinion gear 33 rotatable by the knob 27 and in mesh with a bevel gear 34 secured to the margin-stop 15.

The movement of the carriage 12 to the left, as in letter-feed or word-spacing, during line-typing, may be limited by engagement of the counter-stop 22 with a "right" margin-stop 36 preferably constructed to include a central member or sleeve 37 having a series of arms 38 radiating therefrom at various angles in support of a helical stop-bar 40 at their ends. The stop-bar 40 is helically formed similar to the bar 20, so as to provide an abutment, being serrated at one edge to present a series of shoulders 41 selectively to the path of counter-stop 22, and is directed oppositely from that of the bar 20, that is, bar 20 defines a left-hand helix, whereas bar 40 defines a right-hand helix. As will be hereinafter described in further detail, the "right" margin-stop 36 is capable of both rotational and axial movement and is accordingly mounted on a spindle 42 by the sleeve 37 thereof. Spindle 42 is supported at one end in a bracket 43 secured to the main frame 10 and is rotatable within a bearing 44 of the "left" margin-stop 15, being supported by the bracket 17 disposed between each margin-stop.

The "right" margin-stop has a beveled disk 45 into apertures 46 of which a series of prongs 47 may slide, the prongs being secured so as to project from a toothed wheel 48 by which the rotational position of margin-stop 36 is yieldably secured by a resilient detent 49 engaging the teeth of the wheel 48. Detent 49 is slidably carried in a bracket 50 and backed by a spring 51 to urge same into the teeth of wheel 48.

Control means similar to that of the "left" margin-stop are provided for the "right" margin-stop 36, including a control-knob 52 having a pointer registrable with a "right" margin-dial 53 preferably disposed at the front of the machine opposite the "left" margin-dial 29. Suitable gearing is interposed between the control-knob 52 and the "right" margin-stop 36, comprising a driving gear 55 affixed to the knob 52 and in mesh with a driven gear 56 connected through a flexible shaft 57 to the margin-stop 36, the shaft 57 having a pinion gear 58 in mesh with a driven bevel gear 59 secured to the toothed wheel 48. Rotation of the control-knob 52 will vary the rotational positions of the "right" margin-stop 36, the latter being rotated by the prongs 47 so as to position any one of the shoulders 41 selectively in the path of the counter-stop 22.

The margin-dials 29 and 53 are each calibrated preferably in units of letter-space to represent in the aggregate, the entire carriage movement as controlled by the usual letter-feed mechanism. Should the carriage be capable of lateral movement a distance equivalent to 80 letter-spaces, for example, dial 29 may serve to indicate one-half the range of movement, and will accordingly be calibrated from "0" to "40" letter-spaces and similarly, dial 53 may indicate the other half of the carriage-movement, being appropriately calibrated from "40" to "80" letter-spaces. It will thus be seen that by a certain setting of the respective control-knobs 27 and 52, the marginal limits of carriage-movement may be varied to produce substantially any desired arrangement of the typing matter on the work-sheet such as paragraphing, boxing or indenting, etc. As an illustration, to produce type lines arranged in echelon, the lines being of uniform length, the respective knobs 27 and 52 are set to define the desired line-length and indentation and, after typing the first line, each knob is advanced on its dial a corresponding amount representing that at which the next line is to be offset from the preceding line, and so forth, until the work is completed.

The usual letter-space scale or platen scale may be provided, same being mounted on a suitable portion of the machine. Such a scale is indicated by numeral 54 in Figure 9, mounted on the carriage 12 and is preferably calibrated in units of letter-space to be consistent with the calibrations on the dials 29 and 53. Scale 54 may be employed to advantage in setting the respective margin-stops, the scale serving to indicate the exact numeral at which each of the control-knobs 27, 52 are to be set in order to stop the carriage at a certain margin. For example, should the operator desire to position the margin-line at a certain point from the edge of the work-sheet, this point is found at a certain number on the scale 54 and the appropriate control-knob 27 or 52 is set so that its pointer indicates the corresponding number on the associated dial.

The convenience of adjusting the margin-stops 15 and 36 to certain margins on the work-sheet to coincide with previously typed matter thereon, will be apparent from the following. It may be assumed that the previous setting of the "left" margin-stop 15 has been changed and it is now desired to reset the stop in accordance with the first setting for the left margin, Figure 8. In such case, the platen-carriage is moved until the margin-line of the already typed matter is aligned with the typing-point of the machine. This positioning of the carriage brings the counter-stop 22 to that point in its path of travel at which same would be stopped to determine the previous left-hand margin. The "left" margin-stop 15 is now rotated by the operation of the corresponding control-knob 27, turning same in the direction of the arrow thereon. In this manner a certain shoulder 21 is revolved in turning the margin-stop 15 until the said shoulder abuts the counter-stop 22 which arrests rotation of knob 27 and the "left" margin-stop 15 is thus brought to the desired setting to position the carriage in the further line-typing so that the margin thereof will be in line with the previously typed matter. It will be apparent that the "right" margin-stop 36 may be reset in a similar manner by rotation of the corresponding control-knob 52 in the direction of its arrow after positioning the carriage to align the right-hand margin of the work-sheet with the typing point of the machine.

As shown in Figure 8, the helical stop-bars 20 and 40 substantially embrace or subtend the entire length of carriage-movement in a continuous range of steps, the adjoining shoulders of the two margin-stops 15, 36, being separated to accommodate a suitable width of the counter-stop 22. The counter-stop 22 moves in accordance with the movement of the carriage 12 and may therefore be mounted directly thereon. However, to accommodate up-and-down motion of the carriage in case-shifting, without affecting the elevation of the counter-stop 22, the latter is coupled to the carriage on a cross-rod 60 thereof by articulated links 61, 62, which maintain a fixed lateral relation of the counter-stop 22 to the carriage, although being foldable in a transverse plane to allow the required up-and-down case-shift movement of the carriage. Counter-stop 22 is guided to move in a lineal path along the margin-stops 15, 36, being slidably mounted on the guide-rod 63 of such cross-section as to prevent rotation of the counter-stop thereon and disposed in parallelism with the common axis of the margin-stops 15, 36.

The upper link 61 is adjustably secured against lateral movement on the cros-rod 60 by suitable means such as collars 64, abutting each side thereof. Although it is preferred that the counter-stop 22 maintain a constant lateral relation with the carriage 12, it will be seen that same may be positioned adjustably along the cross-rod 60 for certain purposes, as for example, the typing of successive lines in the aforementioned echelon arrangement. To effect such operation, the margin-stops 15, 36 are set to define the desired line-length at the lateral position on the work-sheet at which the first line is to be typed. The succeeding lines may thereafter be offset progressively by displacing the link 61 along the rod 60 to shift the counter-stop 22 the desired offset, this process being repeated for each typed line by adjusting the collars 64 to a new position at the beginning of each offset line.

The guide-rod 63 also serves to raise the counter-stop 22 free of the margin-stops 15, 36, and, in such function, constitutes part of a margin-stop release means by which the carriage 12 may be permitted to move laterally beyond the limits defined by the respective margin-stops. Guide-rod 63 is accordingly mounted to swing by arms 65 thereof, pivoted at 66 on the main frame 10, the arms normally resting against pins 67. At least one of the arms 65 defines a lever 68 which, at its free end is flexibly connected to a push-rod 69 for manually actuating the margin-stop release by a push-button 70 at the front of the machine. Push-rod 69 moves in a guide-piece 73 which also provides an intermediate bearing for the flexible shaft 57. Push-button 70 is threadedly mounted on the rod 69 for making such adjustments as taking up back-lash in the working parts, and has a flange 71 abutting a member of the main frame 10 in which same is slidably retained, the push-rod 69 moving into engagement with the guide 73 when the release means is actuated to raise the counter-stop 22 free of the margin-stops.

As shown more clearly in Figures 5, 6 and 7, the novel shape of counter-stop 22 assures proper cooperation with the margin-stops 15, 36, both in the margin limiting function and in return of the counter-stop to within the effective field embraced by the helical stop-bars 20 and 40. The opposed ends of the counter-stop 22 are each formed to present upright surfaces for engagement with the shoulders 21, 41 of the respective margin-stops, and the bottom of same is inclined or beveled to meet the plain edges of each of the stop-bars 20, 40 when the counter-stop 22 is returned from beyond same, after use of the margin-stop release. This action is illustrated in Figure 7, wherein it will be seen that as the counter-stop 22 moves along the guide-rod 63 the beveled surface co-operates with the helically-directed plain edge of either stop-rod in a wiping cam action so as to lift the counter-stop 22 gradually together with the guide-rod 63 and associated parts so that the counter-stop rides smoothly over the stop-rod and thereafter lowers into the field defined by the serrated edges of the stop-bars 20, 40, each of the bottom corners at each end of the counter-stop being chamfered to augment the action.

As aforeindicated, the "right" margin-stop 36 is capable of axial movement so as to operate a margin-signal bell and, or a type-action locking system, the axial movement of margin-stop 36 being effective against the pressure of a restoring spring 72. A signal-bell unit 74 is provided, Figure 5, and includes a supporting plate 75 adjustably fixed to the main frame 10 by a screw-and-slot mounting 76. The plate 75 carries a bell 77 against which a hammer 78 may strike, the latter being pivoted on a stud 79 to the plate 75. The hammer 78 has an arm 80 pivoted at 81 on a lever 82 to present a flexible suspension for the hammer, arm 80 having a pin 83 movable in a slot of the lever 82. The pin 83 has a spring 84 urging same against one end of the slot to suspend hammer 78 normally free of the bell 77, at which position lever 82 rests on a stop 85. Lever 82 pivotally carries a weighted trip-dog 86, the beveled end 87 of which is disposed in the path of the disk 45 and prevented from swinging in one direction by abutting the stud 79.

As the carriage 12 moves to the left during the typing of a line, the counter-stop 22 engages one of the shoulders 41 of the margin-stop 36 which thereafter is moved axially so that the bevel of disk 45 engages the trip-dog 86, Figure 5, to wedge the hammer 78 upwardly, and, as further movement of the carriage occurs, the disk 45 releases the trip-dog 86 and the hammer drops until lever 82 hits the stop 85 whence the hammer-arm 80 is whipped, against tension of the spring 84, to drive the hammer 78 against the bell. During return movement of the margin-stop 36 by spring 72 incident to the return of carriage 12, or the operation of the margin-stop release, the trip-dog 86 is swung by disk 45 to allow the latter to pass, the trip-dog thereafter resuming its normal position against the stud 79.

In a similar manner, that is, by lateral movement of the "right" margin-stop 36 a locking device is set to prevent operation of the type-action system of the machine or render same ineffective as the carriage 12 moves a certain distance beyond the set margin. Although other arrangements may be had, it is preferred to effect the locking of the type-action system by obstructing depression of key-levers 88 thereof and accordingly each of the key-levers has a projection 89 for engagement by a lock-bar 90, arms 99 of which are pivoted at 91 on the main frame 10, the lock-bar 90 being yieldably held in unlocked position by a spring 92, Figure 1. A lock-lever 93 is fulcrumed at 94 and has an arm 95 projecting into the path of disk 45. The other end of lock-lever 93 is arranged to actuate a sub-lever 96 pivoted on the main frame at 97, and a pull-link 98 connects the sub-lever 96 to the lock-bar 90. Thus, as the carriage 12 moves beyond the preset margin, determined by the setting of margin-stop 36, the latter is being moved axially so that the disk 45 engages the arm 95 to actuate the lock-lever 93 whereby lock-bar 90 is swung into position beneath the projections 89 and thus obstructs depression of the key-levers 88, the lock-system being unlocked by spring 92 immediately upon return movement of the carriage.

Variations may be resorted to within the scope of the invention, and portions of the improvements may be used without others.

Having thus described my invention, I claim:

1. In a margin-stop device for typewriting machines having a main frame and a carriage movable laterally and case-shiftable thereon, in combination, a margin-stop mounted on said main frame, a counter-stop movable with said carriage, means mounting and guiding said counter-stop comprising an elongate guide-bar movably mounted on said main frame, means operatively connecting said counter-stop and said carriage for movement in unison, and means for moving said guide-bar to shift the path of said counter-stop beyond said margin-stop.

2. In a typewriting machine, the combination with a main frame and a carriage movable relative thereto, of a margin-stop device comprising, a counter-stop movable in a lineal path with said carriage, a first margin-stop, a second margin-stop, each of said margin-stops being rotatably mounted on said main frame in axial alignment and presenting a continuous series of stepped shoulders collectively defining a reversing helix about the axis thereof, said series of stepped shoulders jointly subtending a substantial length of the carriage movement, and rotary control means at the front of the machine operatively connected to each of said margin-stops for varying the rotational position thereof so as to selectively present a shoulder of each stop to the path of said counter-stop.

3. In a typewriting machine, the combination with a main frame and a carriage movable relative thereto, of a margin-stop device comprising, a counter-stop movable in a lineal path with said carriage, a first margin-stop, a second margin-stop, each of said margin-stops being rotatably mounted on said main frame in axial alignment and presenting a continuous series of stepped shoulders collectively defining a reversing helix about the axis thereof, said series of stepped shoulders jointly subtending a substantial length of the carriage movement, a rotary indicating control-element for each of said margin-stops, on the front face of the machine, and means interposed between each of said control elements and a corresponding margin-stop for adjusting the latter said element to present a shoulder thereof to the path of said counter-stop.

4. In a margin-stop device for typewriting machines having a main frame and a carriage movable laterally and case-shiftable thereon, in combination, a margin-stop rotatably mounted on said main frame and including a helically directed strip serrated at one edge to form a series of stop shoulders, a counter-stop movable with said carriage and having a beveled portion to lift same over said helical strip in one direction of travel and to engage a shoulder of said strip in the other direction, means for controlling the rotational position of said margin-stop so as to selectively present a shoulder thereof to the path of said counter-stop, means mounting and guiding said counter-stop comprising an elongate guide-bar movably mounted on said main frame, means operatively coupling said counter-stop and said carriage for movement in unison and permitting independent shifting of said carriage, and margin-stop release means effective by moving said guide-bar to shift the path of said counter-stop beyond said margin-stop strip.

5. In a typewriting machine having a main frame, a carriage movable relative thereto, a type-action system, means for locking said system against operation, and margin-signal means, in combination, a margin-stop device comprising, a counter-stop movable with said carriage, a left margin-stop rotatable on said main frame, a right margin-stop rotatable on said main frame and axially slidable thereon to successively actuate said margin signal and said type-action locking device incident to the right movement of said carriage, each of said margin-stops comprising a series of stop-shoulders defining a helix about the axis thereof, and engageable respectively by said counter-stop, means for controlling the rotational position of said left stop to vary a left margin, operative from the front of the machine, and a second means for controlling the rotational position of said right stop for varying a right margin, operative at the front of the machine.

6. In a typewriting machine, the combination with a main frame, a carriage movable relative thereto in steps of letter spaces and a letter-space scale calibrated to indicate the entire travel of said carriage in units of letter-space, of a margin-stop device comprising, a counter-stop movable with said carriage, a first margin-stop rotatable on said main frame and presenting a series of stepped shoulders at letter-space pitch engageable by said counter-stop in one direction, a second margin-stop rotatable on said main frame and presenting a series of stepped shoulders at letter-space pitch engageable by said counter-stop in the other direction of travel, rotary indicating control-means including a dial at the front of the machine, for adjusting said first margin-stop, and a second rotary indicating control-means including a dial at the front of the machine for adjusting said second margin-stop, each of said control-dials being calibrated in letter spaces to collectively indicate the entire travel of the carriage in accordance with the calibrations of said letter-space scale.

7. In a typewriting machine having a main frame element, a carriage element movable relatively to said frame element, margin-stop mechanism comprising right and left margin stops in axial alignment rotatably mounted on one of said elements and defining a reverse helix of stepped shoulders, a counter-stop on the other said element, and means for rotating the said right and left margin stops to variably present the stepped shoulders of the reverse helix in a lineal path with the counter-stop.

8. In a typewriting machine having a main frame element, a carriage element movable relatively to said frame element, margin-stop mechanism comprising right and left margin stops in axial alignment rotatably mounted on one of said elements and defining a reverse helix of stepped shoulders, a counter-stop on the other said element, and means for rotating the said right and left margin stops to variably present the stepped shoulders of the reverse helix in a lineal path with the counter-stop, the last said means including a manually operable control-member for each of said right and left margin stops, an indicator for each of said stops and detent means for each of said stops whereby the stepped shoulders may be located in proper positions.

TALBERT G. NELSON.